(12) United States Patent
Hermann et al.

(10) Patent No.: US 12,334,858 B2
(45) Date of Patent: Jun. 17, 2025

(54) SMALL ELECTRICAL APPLIANCE WITH IMPROVED MOTOR SPEED CONTROL

(71) Applicant: Braun GmbH, Kronberg (DE)

(72) Inventors: Ferdinand Hermann, Koenigstein (DE); Torsten Klemm, Eschborn (DE); Timo Schmitt, Hintertiefenbach (DE)

(73) Assignee: Braun GMBH, Kronberg (DE)

( * ) Notice: Subject to any disclaimer, the term of this patent is extended or adjusted under 35 U.S.C. 154(b) by 173 days.

(21) Appl. No.: 18/119,386

(22) Filed: Mar. 9, 2023

(65) Prior Publication Data
US 2023/0291337 A1   Sep. 14, 2023

(30) Foreign Application Priority Data
Mar. 10, 2022  (EP) .................................. 22161473

(51) Int. Cl.
*H02P 7/29* (2016.01)
*A61C 17/22* (2006.01)
(Continued)

(52) U.S. Cl.
CPC .............. *H02P 7/29* (2013.01); *A61C 17/221* (2013.01); *A61C 17/34* (2013.01); *B26B 19/28* (2013.01);
(Continued)

(58) Field of Classification Search
CPC ...... H02K 7/145; A61C 17/221; A61C 17/34; A61C 2204/002; B26B 19/28; H02P 7/29
(Continued)

(56) References Cited

U.S. PATENT DOCUMENTS

2004/0239279 A1* 12/2004 Komiya ................. G01H 13/00
                                                              318/606
2005/0033539 A1*  2/2005 Ishizuka ............ G01D 5/24476
                                                               702/94
(Continued)

FOREIGN PATENT DOCUMENTS

EP   3327923 A1   5/2018
ES   2379124 T3   4/2012

OTHER PUBLICATIONS

CM05360FQ Extended EP Search Report and Written Opinion for 22161473.8 dated Aug. 26, 2022, 07 pages.
(Continued)

*Primary Examiner* — Gabriel Agared
(74) *Attorney, Agent, or Firm* — Andrés E. Velarde; Gerd Zetterer

(57) ABSTRACT

The present invention relates to the field of a small electrical appliance, in particular hair removal device or toothbrush, comprising an electric DC motor; a detector for acquiring a detector signal indicative of a rotational speed of the electric DC motor; and a controller for controlling the electric DC motor. The controller is adapted to: determine, based on the detector signal, a first parameter indicative of the rotational speed of the DC motor; determine, based on the detector signal, a second parameter indicative of the rotational speed of the DC motor, wherein the second parameter is different from the first parameter, and wherein the second parameter is determined based on a frequency domain analysis of the detector signal; and adjust a supply voltage of the electric DC motor based on the first parameter and the second parameter.

15 Claims, 3 Drawing Sheets

(51) Int. Cl.
  *A61C 17/34* (2006.01)
  *B26B 19/28* (2006.01)
  *H02K 7/14* (2006.01)

(52) U.S. Cl.
  CPC ........ *H02K 7/145* (2013.01); *A61C 2204/002* (2013.01)

(58) Field of Classification Search
  USPC ............................................................ 318/3
  See application file for complete search history.

(56) References Cited

U.S. PATENT DOCUMENTS

| | | | | |
|---|---|---|---|---|
| 2011/0313717 | A1* | 12/2011 | Lu | G01P 3/489 |
| | | | | 702/147 |
| 2012/0001580 | A1* | 1/2012 | Zhang | G01R 31/343 |
| | | | | 318/490 |
| 2012/0274248 | A1* | 11/2012 | Fricker | H02P 23/14 |
| | | | | 318/400.04 |
| 2013/0262023 | A1* | 10/2013 | Wu | G01P 3/00 |
| | | | | 702/182 |
| 2018/0145618 | A1* | 5/2018 | Neyer | B26B 19/3873 |
| 2020/0059185 | A1* | 2/2020 | Eguchi | H02P 21/24 |
| 2021/0226465 | A1* | 7/2021 | Hermann | B26B 21/4056 |
| 2021/0234496 | A1* | 7/2021 | Seo | H02P 29/662 |

OTHER PUBLICATIONS

CM05360MQ PCT Search Report and Written Opinion for PCT/IB2023/052247 dated May 19, 2023, 10 pages.

Ertl Daniel et al; "A Method for Real-Time Sensorless Speed Control of Brushed DC Motors in Cost Constrained Systems", 2020 2nd Global Power Energy and Communication Conference (GPECOM), IEEE, Oct. 20, 2020 (Oct. 20, 2020), pp. 152-157, XP033854818, DOI: 10.1109/GPECOM49333.2020.9248712 (retrieved on Nov. 4, 2020).

Scott J et al; "Speed Control with Low Armature Loss for very small Sensorless Brushed DC Motors", IEEE Transactions on Industrial Electronics, IEEE Service Center, Piscataway, NJ, USA, vol. 56, No. 4, Apr. 1, 2009, pp. 1223-1229, XP011248692, ISSN: 0278-0046.

* cited by examiner

SMALL ELECTRICAL APPLIANCE WITH IMPROVED MOTOR SPEED CONTROL

FIELD OF THE INVENTION

The present invention relates to the field of small electrical appliances such as battery powered electrical appliances for personal hygiene, in particular to a hair removal device such as an electric shaver or epilator as well as an electric toothbrush. The present invention furthermore relates to a controller for controlling a DC motor of a small electrical appliance and a corresponding method.

BACKGROUND OF THE INVENTION

Battery powered electrical appliances for personal hygiene such as electric shavers, epilators and electric toothbrushes are well known in the art.

An electric shaver, also known as dry razor, electric razor, or simply shaver, is a device with a rotating or oscillating blade or cutting unit. An electric shaver usually does not require the use of shaving cream, soap, or water. The razor may be powered by a small DC motor, which is either powered by batteries or mains electricity. Many modern ones are powered using rechargeable batteries.

An epilator is an electrical device used to remove hair by mechanically grasping multiple hairs simultaneously and pulling them out. The way in which epilators pull out hair is similar to waxing, although unlike waxing, they typically do not remove cells from the epithelium of the epidermis. Aside from the spring in early spring-type epilators, there are no parts in epilators that require regular replacement. Epilators come in corded, rechargeable and battery-operated designs.

The rotational speed of a DC motor decreases when the mechanical load of the motor increases, for example in a dense beard section. At least, this is true when no countermeasures are taken. In the case of a shaver with a rotating motor, the decrease in motor speed may translate to reduced shaving performance. It is therefore desirable to provide a drive control for a DC motor of an electrical household appliance providing constant motor speed in cases with varying load and with constant (not varying and in particular no) load.

EP 3 327 923 A1, an earlier filing of the applicant, discloses a drive control for driving a DC motor of an electrical household appliance, in particular a hair cutting device such as an electric razor, shaver or epilator, at constant rotational speed. The entire disclosure of this document is incorporated herein by reference. The drive control comprises a detection means for determining a parameter indicative of the actual rotational speed of the DC motor and a closed loop control for adjusting a supply voltage to the DC motor based on a control deviation between a target value and the actual value of the parameter indicative of the rotational speed of the DC motor. In order to provide constant motor speed in cases with varying load and with constant (not varying and in particular no) load, the loop control has a fast control and a slow control for adjusting the supply voltage with the fast control providing a faster correction of the control deviation than the slow control. The loop control further comprises a processor means for determining a switching criterion for switching between the fast control and the slow control, wherein the closed loop control is adapted for switching between the fast control and the slow control based on the switching criterion. The disclosure further relates to an electric hair and/or skin treating device.

Ertl. et al. "A Method for Real-Time Sensorless Speed Control of Brushed DC Motors in Cost Constrained Systems", 2nd Global Power, Energy and Communication Conference (GPECOM), IEEE, pages 152-157, 2020 relates to a method for real-time sensorless speed control of brushed DC motors in cost constrained systems. It is suggested to first calibrate the motor constant utilizing a current ripple detection method. Once the motor constant is calibrated, it transitions to back electromotive force (BEMF) measurement method for operation.

SUMMARY OF THE INVENTION

It is an object of the present invention to provide a further improved hair removal device, such as an electric shaver or epilator, or an electric toothbrush. It would be advantageous to control the speed of an electric DC motor of a hair removal device or electric toothbrush under different load conditions with high accuracy while at the same time providing moderate manufacturing costs. In particular, it would be desirable that no further sensor is needed to control the speed of an electric DC motor with high accuracy.

In a first aspect of the present invention, a small electrical appliance, wherein the wherein the small electrical appliance is a hair removal device or toothbrush, is presented. The small electrical appliance comprises
  an electric DC motor;
  a detector for acquiring a detector signal indicative of a rotational speed of the electric DC motor; and
  a controller for controlling the electric DC motor, wherein in that the controller is adapted to:
  determine, based on the detector signal, a first parameter indicative of the rotational speed of the DC motor;
  determine, based on the detector signal, a second parameter indicative of the rotational speed of the DC motor, wherein the second parameter is different from the first parameter, and wherein the second parameter is determined based on a frequency domain analysis (### spectral analysis) of the detector signal; and
  adjust a supply voltage of the electric DC motor based on the first parameter and the second parameter. The controller can be adapted to perform coarse control for adjusting the supply voltage based on the first parameter and to perform fine control for adjusting the supply voltage based on the second parameter.

In a further aspect of the present invention, a corresponding controller for controlling an electric DC motor of a small electrical appliance, in particular hair removal device or toothbrush, is presented. The controller is adapted to: acquire a detector signal indicative of a rotational speed of the electric DC motor; determine, based on the detector signal, a first parameter indicative of the rotational speed of the DC motor; determine, based on the detector signal, a second parameter indicative of the rotational speed of the DC motor, wherein the second parameter is different from the first parameter, and wherein the second parameter is determined based on a frequency domain analysis of the detector signal; and adjust a supply voltage of the electric DC motor based on the first parameter and the second parameter. The controller can be adapted to perform coarse control for adjusting the supply voltage based on the first parameter and to perform fine control for adjusting the supply voltage based on the second parameter.

In a further aspect of the present invention, a method for controlling an electric DC motor of a small electrical appliance, wherein the small electrical appliance is a hair removal device or toothbrush, is presented. The method comprises the steps of: acquiring a detector signal indicative of a rotational speed of the electric DC motor; determining, based on the detector signal, a first parameter indicative of the rotational speed of the DC motor; determining, based on the detector signal, a second parameter indicative of the rotational speed of the DC motor, wherein the second parameter is different from the first parameter, and wherein the second parameter is determined based on a frequency domain analysis of the detector signal; and adjusting a supply voltage of the electric DC motor based on the first parameter and the second parameter. Coarse control for adjusting the supply voltage can be performed based on the first parameter and fine control for adjusting the supply voltage can be performed based on the second parameter.

In yet further aspects of the present invention, there are provided a corresponding computer program which comprises program code means for causing a computer to perform the steps of the controller or control method disclosed herein when said computer program is carried out on a computer as well as a non-transitory computer-readable storage medium that stores therein a computer program product, which, when executed by a processor, causes the control method disclosed herein to be performed.

Preferred embodiments of the invention are defined in the dependent claims. It shall be understood that the claimed controller, method, computer program and medium can have similar and/or identical preferred embodiments as the claimed appliance, in particular as defined in the dependent claims and as disclosed herein.

In conventional controllers for small electric appliances, as e.g. described in the aforementioned EP 3 327 923 A1, a supply current or voltage may be averaged using a low-pass filter and the averaged current or voltage may be used to control the DC motor. The inventors recognized that an advantage of this approach is that no dedicated rotation sensor is required. However, the inventors further recognized that motor parameters such as a winding resistance or manufacturing tolerances may have an impact on the control loop. This may lead to device-to-device variation of the provided rotational speed. An aspect of the present invention is based on the idea to perform a frequency domain analysis of the detector signal. During operation, an electric DC motor may cause ripples on the supply current and voltage for example due to commutator switching, time-varying load conditions and back magnetic forces. A frequency domain analysis allows to obtain actual RPM (revolutions per minute) information that is independent of or at least less impacted by motor parameters such as a coil resistance, a value of a measurement shunt resistor, etc. and their tolerances.

A further advantage of the proposed approach is that the manufacturing cost may be reduced because the hardware requirements regarding device tolerances may be relaxed. Moreover, this can help to reduce the dependency on a certain supplier of circuit elements because circuit elements may be substituted more easily.

The inventors further recognized that it is possible to provide fast adjustment based on the first parameter in combination with slow but precise adjustment based on the second parameter based on the frequency domain analysis. Accordingly, even a small electrical appliance with limited processing power may benefit from the frequency domain analysis, even if the frequency domain analysis may not be performed in real-time but with a certain delay and/or only at intervals. It shall be understood that the controller can be adapted to continuously perform coarse/fast control for adjusting the supply voltage based on the first parameter and to continuously perform fine/slow control for adjusting the supply voltage based on the second parameter. In other words, both may be performed not just once for calibration but continuously and/or in parallel during operation of the small electrical appliance. Hence, even though a small electrical appliance with limited processing power may not be able to quickly perform fine control in case of fast load changes, the parallel coarse control may provide fast adaptation of the supply voltage based on the first parameter.

A further advantage of the proposed solution is that the control can be rather flexible regarding the implementation of the detector. For example, a detector for acquiring a detector signal indicative of a rotational speed of the electric DC motor can be implemented at low cost using analog-to-digital converter (ADC) that measures current or voltage, for example at a serious resistor or shunt resistor or voltage divider coupled to the motor or power supply. Such an ADC may be part of microcontroller that is provided anyway in the electrical appliance, for example for operation of a human-machine-interface (HMI).

In the following, some terms which are used throughout the application, shall be shortly explained, and defined:

As used herein, a small electrical appliance or electrical appliance may refer to an electrical appliance for personal hygiene or personal use such as e.g. a hair removal device or toothbrush. The term small electrical appliance may refer to a hand-held electrical appliance.

As used herein, a computer may refer to a device adapted to execute machine readable instructions, including but not limited to a microcontroller C), ASIC, FPGA, microprocessor, or a general-purpose computer.

As used herein, a controller may be implemented by discrete electronic circuit elements but may also be implemented using integrated circuitry such as e.g. a microcontroller, ASIC, FPGA and the like. The control circuitry may be implemented using a combination of hardware and software adapted to operate said hardware to function as the control circuitry.

As used herein the term continuously may indicate that both coarse based on the first parameter and fine control based on the second parameter are active and operational during use of the hair removal device or toothbrush, for example while the motor is running, such that during the entire shaving time while the motor is running or during the entire toothbrushing session while the motor is running both coarse/fast and fine/slow control is performed.

As used herein the term high accuracy and low accuracy can be understood as relative terms, which may indicate that the control based on the second parameter may provide a higher accuracy than control based on the first parameter. For example, high accuracy may be at least twice as accurate, in particular at least three times as accurate, in particular at least four times as accurate, in particular at least ten times as accurate than low accuracy. As used herein, accuracy may refer to a maximum deviation or standard deviation of an expected value such as an RPM, revolutions per minute. Fast/coarse control may for example provide an accuracy of +−8% regarding RPM, whereas slow/fine control may for example provide an accuracy of +−1% regarding RPM. Similarly, the terms fine and coarse or fast and slow, and the like can be understood as relative terms, which may for example indicate that control based on the second parameter may be finer and/or slower, in particular at least twice, in particular at least three times, in particular at least four times, in particular at least ten times finer and/or slower than control based on the first parameter. Similarly, the terms fast and slow refresh rate can be understood as relative terms, which may indicate that the first parameter is determined at a higher refresh rate (e.g. with lower accuracy) than the second parameter which may be determined at a lower refresh rate (e.g. with high accuracy). For example, for a higher refresh rate, a determination of the first parameter may be at least twice as fast, in particular at least four times as fast, in particular at least ten times as fast as the determination at the lower refresh rate. For example, the first parameter may be determined repetitively at a refresh rate of at least 0.5 kHz, in particular at least 1 kHz, in particular at least 2 kHz, in particular at least 10 kHz, in particular at least 100 kHz. For example, the second parameter may be determined repetitively at a refresh rate of no more than 100 kHz, in particular no more than 10 kHz, in particular no more than 2 kHz, in particular no more than 1 kHz, in particular no more than 0.5 kHz.

The small electrical appliance is a hair removal device or an electric toothbrush. The small electrical appliance may be a battery powered electrical appliance for personal hygiene which may be a hair removal device, in particular a shaver or an epilator, or an electric toothbrush.

The first parameter may be indicative of an amplitude of the detector signal. This can also include an amplitude difference, for example a difference with respect to a reference amplitude. The second parameter may be indicative of a frequency component of the detector signal. This can also include a frequency difference with respect to a reference frequency. For example, the first parameter can represent an amplitude (or magnitude) of a motor current or a voltage of the DC motor or an amplitude (or magnitude) of a supply voltage. A larger motor voltage generally corresponds to a higher rotational speed. A lower motor voltage generally corresponds to a lower rotational speed. The relation between applied motor current or voltage can be provided for example by a lookup table. This aspect is that an amplitude can generally be measured and evaluated high-speed even with limited processing power. Accordingly, it is possible to provide the first parameter with high refresh frequency. The determination of the second parameter, which is determined based on frequency domain analysis of the detector signal, may be available at a lower refresh frequency but with higher accuracy.

The detector signal may be indicative of at least one of (a) a motor current of the electric DC motor, (b) a motor voltage of the electric DC motor and/or (c) a supply voltage. An advantage is that these parameters can be determined with low effort. On the one hand, current ripples on the motor current may be evaluated in the frequency domain to obtain the second parameter. On the other hand, it is possible to evaluate a back electromagnetic force also referred to as backEmf as an indicator for the rotational speed to obtain the first parameter. For this, the motor current can be measured, and the rotational speed may be calculated via the equation $U_{mot}=i*R_{mot}+backEmf$, wherein i is the measure current, $R_{mot}$ is the resistance of the electric motor and backEmf is the voltage contribution due to the back electromagnetic force. The motor current may be measured by voltage drop across series resistor connected in series with the electric DC motor. Similarly, it is possible to evaluate the motor voltage of the electric DC motor. On the one hand, an average value of the motor voltage may be used as the first parameter. On the other hand, the variations of the motor voltage may be evaluated in the frequency domain to obtain the second parameter. The third option is to evaluate supply voltage of the small electrical appliance. The lower the supply voltage of the appliance, the lower the expected rotational speed of the electric DC motor. Again, an amplitude or magnitude of the supply voltage may be evaluated to obtain the first parameter and variations of the supply voltage the frequency domain may be evaluated to obtain the second parameter. Advantageously, the first parameter indicative of the rotational speed of the DC motor and the second parameter indicative of the rotational speed of the DC motor are determined based on the same detector signal. An advantage of evaluating the same detector signal is that no separate dedicated sensors are required to obtain the first and the second parameter indicative of the rotational speed of the DC motor.

The controller may be adapted to perform coarse control for adjusting the supply voltage based on the first parameter. The controller may be adapted to perform fine control for adjusting the supply voltage based on the second parameter. Similarly, the controller may be adapted to perform fast control for adjusting the supply voltage based on the first parameter and the controller may be adapted to perform slow control for adjusting the supply voltage based on the second parameter. As indicated above, the controller can be adapted to continuously perform coarse/fast control for adjusting the supply voltage based on the first parameter and to continuously perform fine/slow control for adjusting the supply voltage based on the second parameter. In other words, both may be performed continuously and/or in parallel during operation of the small electrical appliance. The first parameter may be determined for example based on an amplitude measurement with low effort at high refresh rates. It is thus possible to quickly react on changes of load of the electric motor. The second parameter may be determined for example based on frequency domain analysis at lower refresh rates with higher accuracy. If the load does not change much, it is just possible to provide highly accurate control even with limited processing power.

The controller may comprise a first controller and a second controller. The first controller may be adapted to adjust the supply voltage of the electric DC motor based on the first parameter indicative of an amplitude of the detector signal. The second controller may be adapted to adjust the supply voltage of the electric DC motor based on the second parameter indicative of a frequency component of the detector. The first controller and the second controller may be cascaded. For example, the second controller may be used as an outer controller and the first controller may be used as an inner controller. Thereby, it is possible to quickly respond to fast changes with the inner controller and more slowly but with higher accuracy based on the outer controller.

In a refinement, the second controller may be adapted to provide a set point for the first controller. In addition, or in the alternative, the second controller may be adapted to provide a correction for the first controller. In addition, or in the alternative, the second controller may be adapted to adjust a feedback path of a feedback loop of the first controller. In other words, the second more accurate but presumably slower controller provides an input for the first. But presumably less accurate first controller. An advantage of this approach is to combine the advantages of both approaches by overcoming the disadvantages of them.

The detector signal may be sampled at least at twice the maximum rotational frequency of the electric DC motor; in particular wherein the detector signal is sampled at at least twice the maximum rotational frequency times the number of commutations of the electric motor per revolution. An advantage is that the rotational frequency can be determined based on the frequency domain analysis of the detector signal, which is sampled at a sufficiently high rate to reduce the impact of artefacts.

Determining the first parameter may comprise averaging the detector signal. Determining the second parameter may comprise a Fourier analysis of the detector signal, in particular an FFT-analysis of the detector signal. An advantage is that the first parameter may be determined with very little processing effort. On the other hand, the second parameter can be determined with very high accuracy albeit with higher computational effort. The first parameter may be determined at a high refresh rate (with lower accuracy) whereas the second parameter is determined with high accuracy (at a lower refresh rate).

The second parameter may be indicative of a frequency peak of the spectrum, in particular wherein the frequency peak may be an integer multiple of the rotational frequency. An advantage of this embodiment is that the second parameter may directly reflect the rotational speed in revolutions per minute (RPM). The integer multiple factor may be attributed to natural number of commutator switches during one revolution. Since this parameter is determined by the used electric motor, the frequency of the frequency peak may simply be divided by the number of commutator switches to obtain the actual rotational frequency.

The first and the second parameter are determined in parallel. In an embodiment, the second parameter may be used for adjusting the supply voltage of the DC motor if a difference between a first frequency peak and a second frequency peak of frequency domain analysis is below a predetermined threshold. If the frequency domain analysis shows are pronounced frequency peak, this means that the DC motor is running in a stable state. In this case, the second parameter may be used for highly accurate control. On the other hand, if the frequency domain analysis does not provide a pronounced frequency peak, this means that the rotational speed is changing. In this case, the first parameter which may be indicative of an amplitude of the detector signal, may be used.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
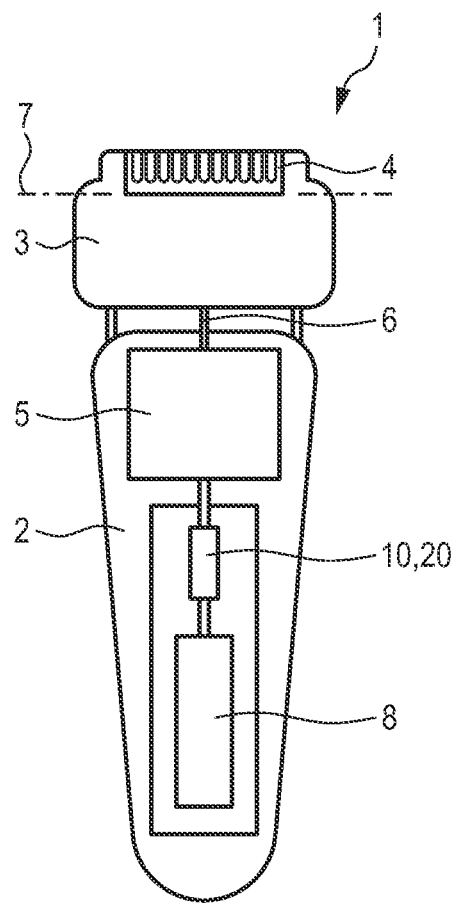
FIG. 1 shows a schematic diagram of a first embodiment of a small electrical appliance in form of an electric shaver.

FIG. 1 schematically shows a first embodiment of a battery powered electrical appliance for personal hygiene in form of an electric shaver. The appliance is therein denoted in its entirety by reference numeral 1. The shaver comprises a shaver body or main body 2 and a shaver head 3 as generally known in the art. The shaver head 3 comprises a cutter 4 with one or more razor blades. The cutter 4 is set in motion by an electric DC motor 5 that can be arranged within the main body 2 or within the shaver head 3. The electric motor 5 is connected to the cutter 4 via a drive train 6. The cutter 4 can move along a swivel axis 7. The shaver head 3 may, to a certain extent, be movable with respect to the shaver body 2 such that the shaver head can adapt to a contour of a user's face. A battery 8, in particular a lithium-ion or NiMH battery that can be arranged within the main body 2 may serve as the energy source to power the small electrical appliance 1.

The small electrical appliance 1 further comprises a detector 10 for acquiring a detector signal indicative of a rotational speed of the electric DC motor 5 and a controller 20 for controlling the electric DC motor 5. In the diagrams shown in FIGS. 1 and 2, the detector 10 and the controller may be implemented together, for example by a microcontroller with a processor and one or more integrated analog-to-digital converters that is adapted to perform the steps as described with reference to FIG. 3. An exemplary circuit diagram will be described further below with reference to FIG. 4.

Figure 2:
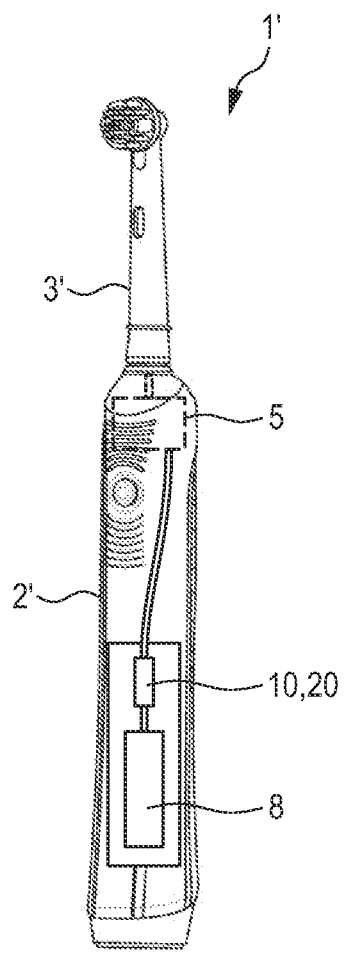
FIG. 2 shows a schematic diagram of a second embodiment of a small electrical appliance in form of a toothbrush.

FIG. 2 shows a further embodiment of a battery powered electrical appliance 1 for personal hygiene in form of an electric toothbrush 1'. Further embodiments of a small electrical appliance can refer to other embodiments of a battery powered electrical appliance for personal hygiene such as other forms of hair removal devices, such as epilators or light pulse-based hair removal devices. The toothbrush 1' comprises a main body 2' and a toothbrush head 3'. The toothbrush is driven by an electric DC motor 5.

Figure 3:
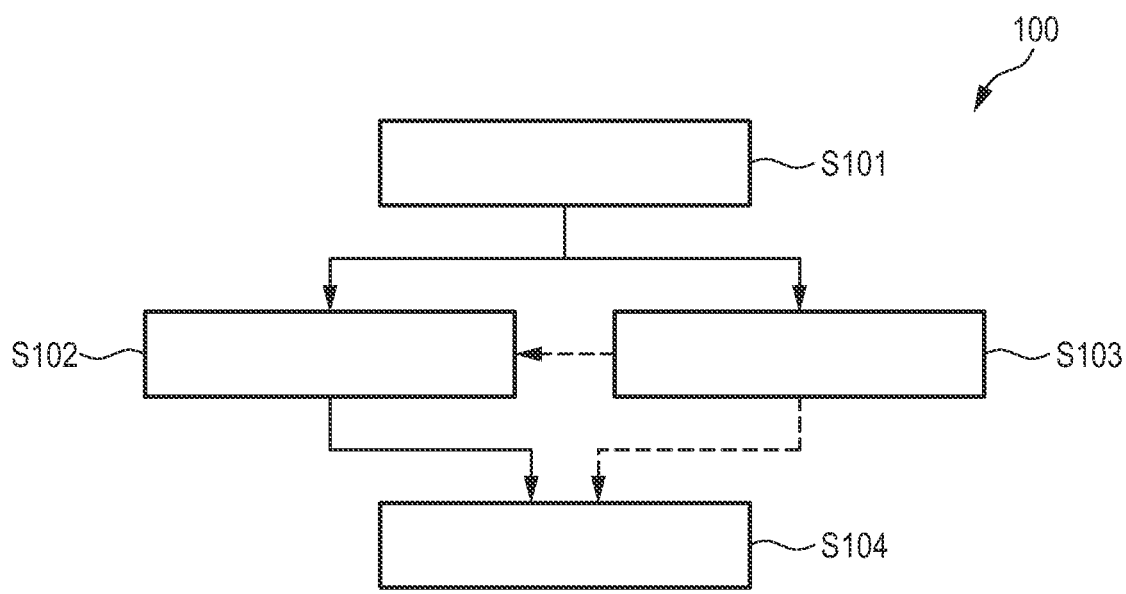
FIG. 3 shows a flow chart of a method according to an aspect of the present disclosure.

FIG. 3 shows a flow chart of a method 100 for controlling an electric DC motor of a small electrical appliance (1, 1'), in particular hair removal device (1) or toothbrush (1'). In a first step S101, a detector signal indicative of a rotational speed of the electric DC motor is acquired. The detector signal can be indicative of at least one of (a) a motor current of the electric DC motor, (b) a motor voltage of the electric DC motor and/or (c) a supply voltage. For example, the motor current flowing through the motor during operation of the electrical appliance may be measured. In addition or in the alternative, the voltage applied to the electric motor 5 during operation of the electrical appliance 1, 1' and/or a supply voltage of the battery 8 may be measured.

In step S102, a first parameter indicative of the rotational speed of the DC motor may be determined based on the detector signal acquired in step S101. For example, the first parameter may be indicative of an (average) amplitude of the detector signal. In step S103, a second parameter indicative of the rotational speed of the DC motor may be determined based on the detector signal acquired in step S101. In contrast to the first parameter in the given example, the second parameter may be determined based on a frequency domain analysis of the detector signal. Hence, a spectral analysis can be performed to obtain the second parameter. The second parameter can be indicative of a frequency component of the detector signal, for example a frequency peak in a spectral analysis. In case the electric motor performs 8 commutator switches per revolution, this can result in a frequency peak at 8 times the rotational frequency of the electric motor. The speed of the electric motor can thus be determined by dividing the peak frequency of the spectrum by the number of commutator switches.

In step S104, a supply voltage of the electric DC motor is adjusted based on the first parameter and the second parameter. For example, the supply voltage may be adjusted by a pulse-width or pulse frequency modulation. For example, a pulse width and/or pulse frequency may be adjusted directly based on the first and/or second parameter. In addition, or in the alternative, the first and/or second parameter may be compared with a desired set point and the supply voltage may be adjusted based on a deviation between the first and/or second parameter and the desired set point. As indicated by the dashed arrow from step S103 to step S102, the second parameter determined in step S103 may, in addition or in the alternative, be provided to the step S102 of determining the first parameter such that the first parameter may be determined or influenced by the determined second parameter. For example, the second parameter may be used in an outer control loop and already considered in an inner control loop for determining the first parameter. Further details and examples will be provided with reference to FIGS. 5 to 7.

Figure 4:
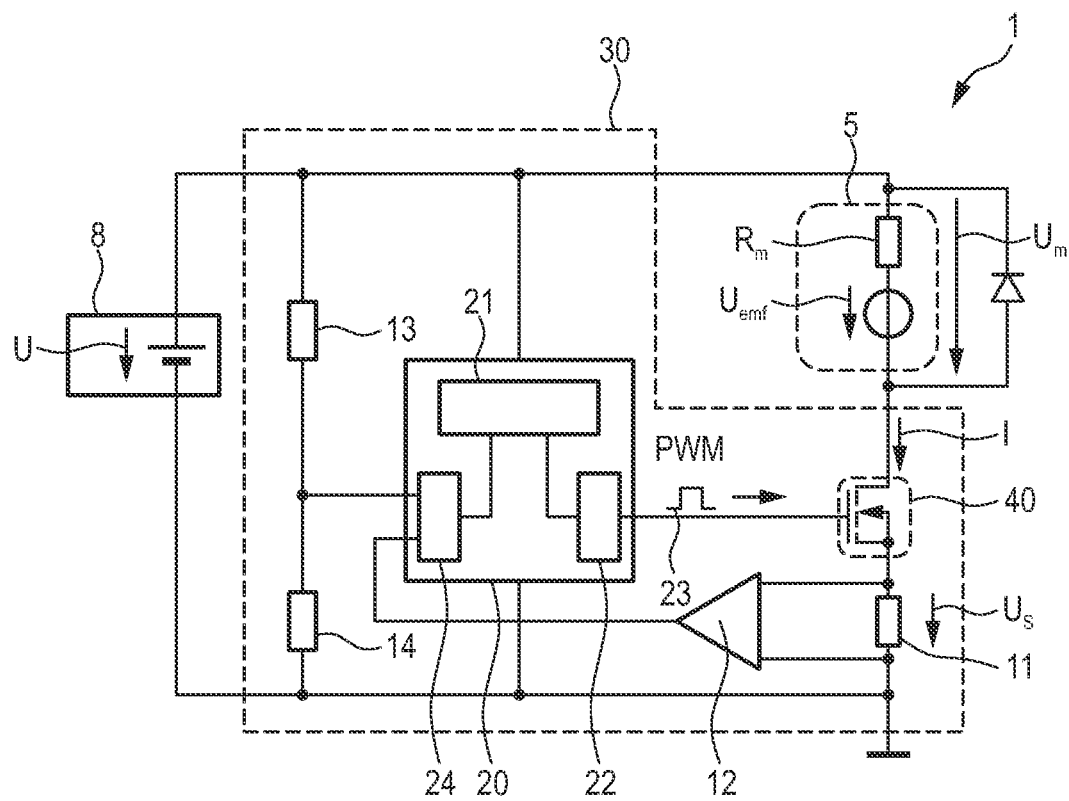
FIG. 4 shows an exemplary block diagram of circuitry of a small electrical appliance.

FIG. 4 shows an exemplary block diagram of circuitry of a small electrical appliance 1 comprising an electric DC motor 5, a power source 8 and circuitry 30. The power source 8 provides the electric DC motor 5 and the circuitry 30 with electric energy. In the given example, a DC voltage U is provided. The power source 8 can be a rechargeable battery. The electric DC motor 5 can be switched on and off and operated by means of a transistor 40 connected in series with the electric DC motor 5. The circuitry 30 comprises a controller 20 for controlling the electric DC motor 5. The controller 20 can adjust a supply voltage provided the electric DC motor 5 by operating the transistor 40. More precisely, the controller may comprise a processor 21 that controls an output 22 which provides a control signal 23 to the transistor 40. For example, the output may be a PWM (pulse width modulation) module that provides a PWM signal of variable duty cycle to the transistor 40. However, other ways of adjusting the supply voltage are possible as well such as a pulse frequency modulation or using a variable resistance.

In the exemplary embodiment shown in FIG. 4, the detector 10 (FIGS. 1 and 2) for acquiring a detector signal indicative of a rotational speed of the electric DC motor 5 may comprise a resistor 11 that is connected in series with the electric DC motor 5 and the transistor 40. The larger the current I flowing through the electric motor and the series resistor, the larger the voltage drop across the series resistor 11. The detector may optionally further comprise an operational amplifier 12 to sense and amplify the voltage drop Us across the series resistor 11. The operational amplified 12 may in turn be connected to an analog-to-digital-converter 24 of the controller 20. In an embodiment, the detector may at least in part be part of the controller. For example, an ADC-input of a microcontroller may be used to directly acquire a voltage, e.g. at the upper node of the series resistor 11.

Referring again to FIG. 4, in addition or in the alternative to the series resistor 11, the supply voltage U may be acquired. For example, a voltage divider 13, 14 may be provided and the supply voltage may be determined again via an analog-to-digital converter 24 of the controller 20.

Instead of applying a low-pass filter, as e.g. in EP 3 327 923 A1 as cited above in the background section, it is suggested to preserve the frequency content of the detector signal. The signals that arrive at the controller 20 thus still include frequency components such as ripples caused during operation of the electric DC motor. These frequency components are a further source of information for determining the rotational speed of the electric DC motor. Since the frequency components are largely independent of tolerances it is possible to determine the rotational speed of the DC motor with high accuracy even in view of tolerances of circuit elements. The detector signal may be sampled at at least twice the maximum rotational frequency of the electric DC motor; in particular at at least twice the maximum rotational frequency times the number of commutations of the electric motor per revolution. Thereby the detector signal is sufficiently oversampled to avoid artefacts.

As indicated in the flow chart shown in FIG. 3, the controller 20 of FIG. 4 is adapted to determine, based on the detector signal, a first parameter indicative of the rotational speed of the DC motor and to determine, based on the detector signal, a second parameter indicative of the rotational speed of the DC motor, wherein the second parameter is different from the first parameter, and wherein the second parameter is determined based on a frequency domain analysis of the detector signal, and to adjust a supply voltage of the electric DC motor 5 based on the first parameter and the second parameter. The detector signal may represent the motor current I or the voltage drop Us across the series resistance 11. In addition, or in the alternative, the detector signal may represent a supply voltage measured via the voltage divider 13, 14. The first parameter may be determined by an average of the respective detector signal. This can be quickly determined with low processing power. On the other hand, the second parameter may be obtained by performing a Fourier analysis of the detector signal, in particular a computationally efficient FFT analysis. As described above, the second parameter can be indicative of a frequency peak of the spectrum, in particular wherein the frequency peak is an integer multiple of the rotational frequency.

Figure 5:
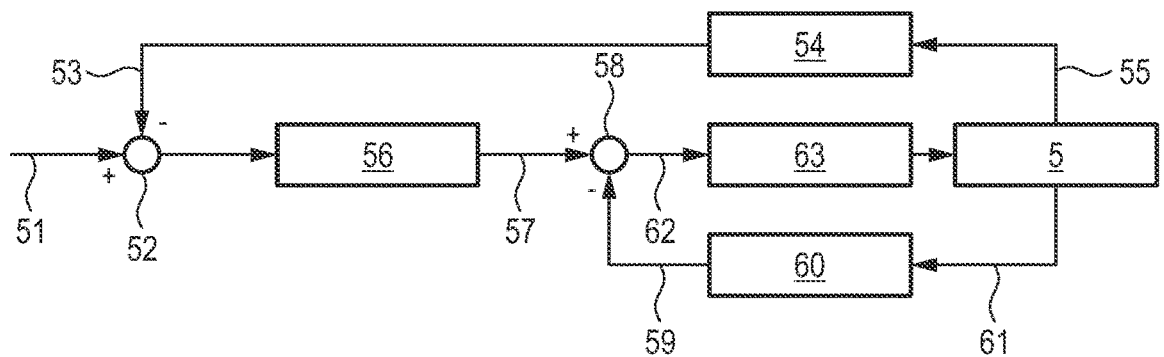
FIG. 5 shows a first exemplary control loop configuration.
Figure 6:
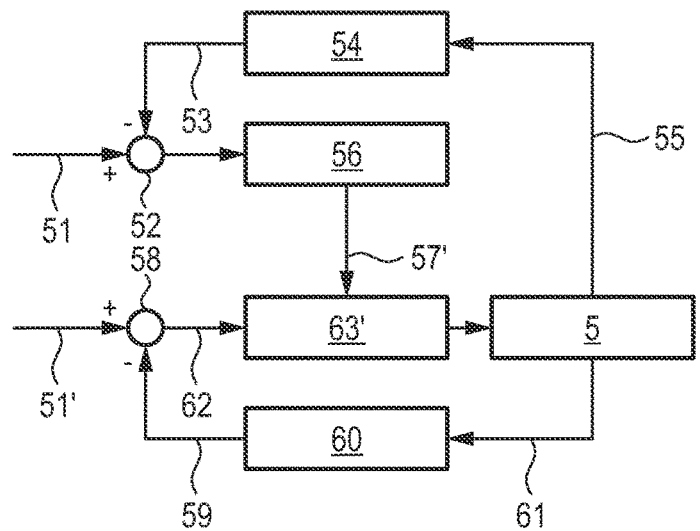
FIG. 6 shows a second exemplary control loop configuration.
Figure 7:
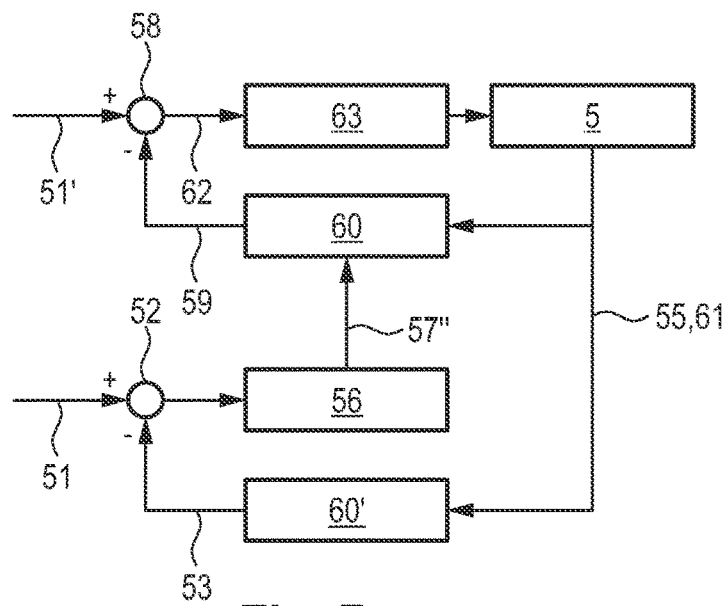
FIG. 7 shows a third exemplary control loop configuration.

FIGS. 5 to 7 illustrate exemplary embodiments of the motor control based on the first parameter and the second parameter.

Referring to FIG. 5, a desired set point such as a desired rotational speed of the electric DC motor, herein briefly referred to as electric motor or motor, may be provided as an input 51. The input 51 is provided to summing node that calculates the difference or error between the input 51 and a feedback signal 53. In the exemplary embodiment, the feedback signal 53 can be the second parameter indicative of the rotational speed of the DC motor 5. The feedback can be determined in step 54 based on a detector signal 55 from the electric motor based on a frequency domain analysis. The output 55 of the summing node can be used for highly accurate control in step 56. This can be seen as a second controller adapted to adjust the voltage of the electric DC motor based on the second parameter indicative of a frequency component of the detector signal.

Advantageously, rather than directly using the output of step 56 for adjusting a supply voltage of the electric DC motor 5, the output of step 56 may be provided as a set point 57 to a further summing node 58 that calculates the different or error between the input 57 and a further feedback signal 59. In the exemplary embodiment, the feedback signal 59 can be the first parameter indicative of the rotational speed of the DC motor 5. The feedback can be determined in step 60 based on a detector signal 61 from the electric motor by evaluating an amplitude of the detector signal. This can be seen as a first controller adapted to adjust the voltage of the electric DC motor based on the first parameter indicative of a frequency component of the detector signal.

Is shall be understood that, even though separate detector signals 55, 61 are illustrated in FIG. 5, the same detector signal may be used but processed differently in steps 54 and 60. Since the amplitude of the detector signal can be quickly evaluated even in a low-cost small electrical appliance with limited processing power, the output 62 of the summing node can be used for less accurate but fast control in step 63.

FIG. 6 and FIG. 7 illustrate further variants, wherein the controller is adapted to adjust a supply voltage of the electric DC motor 5 based on the first parameter determined in step 60 and the second parameter determined in step 54. The following will thus highlight the differences over the embodiment described with reference to FIG. 5. Referring to FIG. 6, instead of providing a set point for the first controller, more precisely to the summing node 58, the output 57' of step 56, i.e., the output of the second controller, may be used to provide a correction factor for the first controller in step 63'. Referring now to FIG. 7, in addition or in the alternative to correcting control parameters in step 63, the output 57" of step 56, i.e. the output of the second controller, may be used to provide a correction factor to a feedback path in step 60' such that the accuracy of the fast control loop can be further improved by further using the information from the frequency domain analysis.

In conclusion, a further improved small electrical appliance is provided. In particular, the proposed solution may help to combine the advantages of controlling the rotational speed of the electric DC motor quickly based on a first parameter, e.g. indicative of an amplitude of a detector signal, and with high accuracy based on a second parameter, wherein the second parameter is determined based on a frequency domain analysis of the detector signal.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

It shall be understood that the functions performed by the controller may be more generally performed by a small electrical appliance. The controller may be implemented by one or more entities. In an advantageous embodiment, the controller and/or detector can be implemented by circuitry comprising a microcontroller.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. Small electrical appliance, wherein the small electrical appliance is a hair removal device or an electric toothbrush, comprising
    an electric DC motor;
    a detector for acquiring a detector signal indicative of a rotational speed of the electric DC motor; and
    a controller for controlling the electric DC motor;
    characterized in that the controller is configured to:
        determine, based on the detector signal, a first parameter indicative of the rotational speed of the DC motor;
        determine, based on the detector signal, a second parameter indicative of the rotational speed of the DC motor, wherein the second parameter is different from the first parameter, and wherein the second parameter is determined based on a frequency domain analysis of the detector signal; and
        adjust a supply voltage of the electric DC motor based on the first parameter and the second parameter;
        wherein the controller is adapted to perform coarse control for adjusting the supply voltage based on the first parameter and to perform fine control for adjusting the supply voltage based on the second parameter.

2. The small electrical appliance as claimed in claim 1, wherein the first parameter is indicative of an amplitude of the detector signal and wherein the second parameter is indicative of a frequency component of the detector signal.

3. The small electrical appliance as claimed in claim 1, wherein the detector signal is indicative of at least one of (a) a motor current of the electric DC motor, (b) a motor voltage of the electric DC motor and/or (c) a supply voltage.

4. The small electrical appliance as claimed in claim 1, wherein the controller is adapted to continuously perform both coarse control for adjusting the supply voltage based on the first parameter and to continuously perform fine control for adjusting the supply voltage based on the second parameter.

5. The small electrical appliance as claimed in claim 1, wherein the controller is adapted to perform fast control for adjusting the supply voltage based on the first parameter and to perform slow control for adjusting the supply voltage based on the second parameter.

6. The small electrical appliance as claimed in claim 1, wherein the controller comprises a first controller and a second controller, wherein the first controller is adapted to adjust the supply voltage of the electric DC motor based on the first parameter indicative of an amplitude of the detector signal and wherein the second controller is adapted to adjust the supply voltage of the electric DC motor based on the second parameter indicative of a frequency component of the detector signal.

7. The small electrical appliance as claimed in claim 6, wherein the first controller and the second controller are cascaded.

8. The small electrical appliance as claimed in claim 6, wherein the second controller provides a set point for the first controller.

9. The small electrical appliance as claimed in claim 6, wherein the second controller adjusts a feedback path of a feedback loop of the first controller.

10. The small electrical appliance as claimed in claim 1, wherein the detector signal is sampled at least twice the maximum rotational frequency of the electric DC motor; wherein the detector signal is sampled at at least twice the maximum rotational frequency times the number of commutations of the electric motor per revolution.

11. The small electrical appliance as claimed in claim 1, wherein determining the first parameter comprises averaging the detector signal; and/or wherein determining the second parameter comprises a Fourier analysis of the detector signal.

12. The small electrical appliance as claimed in claim 1, wherein the first parameter is determined at a high refresh rate with lower accuracy and the second parameter is determined with high accuracy at a lower refresh rate.

13. The small electrical appliance as claimed in claim 1, wherein the second parameter is indicative of a frequency peak of the spectrum, wherein the frequency peak is an integer multiple of the rotational frequency.

14. The small electrical appliance as claimed in claim 1, wherein the first and the second parameter are determined in parallel, wherein the second parameter is used for adjusting the supply voltage of the DC motor if a difference between a first frequency peak and a second frequency peak of frequency domain analysis is below a predetermined threshold.

15. Method for controlling an electric DC motor of a small electrical appliance, wherein the small electrical appliance is a hair removal device or an electric toothbrush; the method comprising the steps of:
  acquiring a detector signal indicative of a rotational speed of the electric DC motor;
  determining, based on the detector signal, a first parameter indicative of the rotational speed of the DC motor;
  determining, based on the detector signal, a second parameter indicative of the rotational speed of the DC motor, wherein the second parameter is different from the first parameter, and wherein the second parameter is determined based on a frequency domain analysis of the detector signal; and
  adjusting a supply voltage of the electric DC motor based on the first parameter and the second parameter;
  wherein coarse control for adjusting the supply voltage is performed based on the first parameter and wherein fine control for adjusting the supply voltage is performed based on the second parameter.

* * * * *